(12) United States Patent
Seike (10) Patent No.: US 9,862,902 B2
(45) Date of Patent: Jan. 9, 2018

(54) CORROSION-RESISTANT SURFACES FOR REACTORS

(71) Applicant: EMPIRE TECHNOLOGY DEVELOPMENT LLC, Wilmington (DE)

(72) Inventor: Aya Seike, Tokyo (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 14/906,530

(22) PCT Filed: Aug. 1, 2013

(86) PCT No.: PCT/US2013/053208
§ 371 (c)(1),
(2) Date: Jan. 20, 2016

(87) PCT Pub. No.: WO2015/016931
PCT Pub. Date: Feb. 5, 2015

(65) Prior Publication Data
US 2016/0160137 A1    Jun. 9, 2016

(51) Int. Cl.
*C10J 3/20* (2006.01)
*C10J 3/02* (2006.01)
(Continued)

(52) U.S. Cl.
CPC ............... *C10J 3/78* (2013.01); *B01J 3/008* (2013.01); *B01J 8/0005* (2013.01); *B01J 19/02* (2013.01);
(Continued)

(58) Field of Classification Search
CPC ................ C10J 3/78; C10J 2300/1853; C10J 2300/093; C10J 3/02; C10J 3/20;
(Continued)

(56) References Cited

U.S. PATENT DOCUMENTS 5,461,648 A * 10/1995 Nauflett .................. B01J 3/008
                                                            210/177
5,558,783 A    9/1996 McGuinness
(Continued)

FOREIGN PATENT DOCUMENTS

CA           2007501 A1 *  8/1990 ......... C03B 37/0805
CN        101104937 A      1/2008
(Continued)

OTHER PUBLICATIONS

Cai, R. and Yan, Y., "Corrosion-Resistant Zeolite Coatings," Research Topical Symposium Proceedings, vol. 64, No. 3, pp. 271-278 (Mar. 2008).
(Continued)

*Primary Examiner* — Anthony J Zimmer
*Assistant Examiner* — Syed Iqbal
(74) *Attorney, Agent, or Firm* — Dorsey & Whitney LLP (57) ABSTRACT

Provided herein are corrosion-resistant reactors that can be used for gasification, and methods of making and using the same. Some embodiments include a corrosion-resistant ceramic layer. According to some embodiments, the corrosion-resistant ceramic layer has a negative charge. At temperature above water's critical point (for example, 374 CC and at 22.1 MPa I 218 atm), water can behave as an adjustable solvent and can have tunable properties depending on temperature and pressure.

31 Claims, 6 Drawing Sheets

(51) Int. Cl.
    *C25D 13/02*     (2006.01)
    *C10J 3/78*     (2006.01)
    *B01J 19/02*     (2006.01)
    *B01J 3/00*     (2006.01)
    *B01J 8/00*     (2006.01)

(52) U.S. Cl.
    CPC . *C10J 3/02* (2013.01); *C10J 3/20* (2013.01); *C25D 13/02* (2013.01); *B01J 2219/024* (2013.01); *B01J 2219/0218* (2013.01); *C10J 2300/093* (2013.01); *C10J 2300/0979* (2013.01); *C10J 2300/1853* (2013.01)

(58) Field of Classification Search
    CPC .. C10J 2300/0979; B01J 8/0005; B01J 3/008; B01J 19/02; B01J 2219/024; B01J 2219/0218; C25D 13/02
    See application file for complete search history.

(56) References Cited

U.S. PATENT DOCUMENTS

| | | | |
|---|---|---|---|
| 5,885,356 A | 3/1999 | Zhao et al. | |
| 6,277,327 B1 | 8/2001 | Tabata et al. | |
| 6,444,600 B1 * | 9/2002 | Baek | C04B 30/02 501/95.1 |
| 6,958,122 B1 | 10/2005 | Gidner et al. | |
| 2008/0199374 A1 * | 8/2008 | Tegman | C04B 35/113 422/241 |

FOREIGN PATENT DOCUMENTS

| | | |
|---|---|---|
| CN | 102190363 | 9/2011 |
| CN | 102989371 | 3/2013 |
| JP | H11217686 A | 8/1999 |
| JP | 200189134 A | 4/2001 |
| JP | 2010189684 A | 9/2010 |
| JP | 4577862 B2 | 11/2010 |
| WO | WO2007030078 | 3/2007 |

OTHER PUBLICATIONS

Chakinala, A. G., "Supercritical water gasifucation of biomass," University of Twente, An experimental study of model compounds and potential biomass feeds, pp. 1-197 (1979).

Glaser, R., "Novel process options for the application of zeolites in supercritical fluids and ionic liquids", Chem. Eng. Technol., vol. 30, No. 5, pp. 557-568 (2007).

International Search Report and Written Opinion for PCT Application No. PCT/US2013/053208 mailed Jan. 29, 2014.

Niu, G., et al., "Thermal and hydrothermal stability of siliceous Y zeolite and its application to high-temperature catalytic combustion," Appl. Catalysis B: Environment, vol. 21, No. 1, pp. 63-70 (May 1999).

Koura, N., et al., "Preparation of Highly Functional Material Film Produced Using the Migration Electrodeposition Method Surface", vol. 42, No. 1, p. 20, Abstract (2004).

\* cited by examiner

- 610 Substrate
- 620 Bath
- 630 Electrodes
- 640 Power Supply

Figure 6

CORROSION-RESISTANT SURFACES FOR REACTORS

CROSS-REFERENCE TO RELATED APPLICATION

This application is a U.S. National Stage filing under 35 U.S.C. §371 of PCT International Application No. PCT/US2013/053208 filed on Aug. 1, 2013.

BACKGROUND

At temperature above water's critical point (for example, 374° C. and at 22.1 MPa/218 atm), water can behave as an adjustable solvent and can have tunable properties depending on temperature and pressure. Under such conditions, coal can be decomposed by hydrolysis, and cleavage products of coal can dissolve in the supercritical water, thus minimizing tar and char formation. This processing of coal can be performed within a supercritical water gasification reactor.

SUMMARY

In some embodiments, a reactor is provided. The reactor can include a reaction chamber. The reactor can include a metal surface at least partially enclosing the reaction chamber. The reactor can include a corrosion-resistant ceramic layer disposed between at least a portion of the metal surface and the reaction chamber. The corrosion-resistant ceramic layer can be negatively charged.

In some embodiments, a method of gasifying an organic material is provided. The method can include providing a reactor. The reactor can include a reaction chamber, a metal surface at least partially enclosing the reaction chamber, and a corrosion-resistant ceramic layer disposed between at least a portion of the metal surface and the reaction chamber. The corrosion-resistant ceramic layer can be negatively charged. The method can include disposing the organic material in the reaction chamber. The method can include contacting water with the organic material in the reaction chamber. In some embodiments, the water is at least at a supercritical temperature and a supercritical pressure. The method can include recovering a gas product from the reaction chamber.

In some embodiments, a method of making a reaction chamber is provided. The method can include providing a liquid mixture having one or more electrodes at least partially disposed in the liquid mixture. The liquid mixture can include a ceramic powder dispersed in a solvent. The method can include disposing a metal surface at least partially within the liquid mixture. The method can include applying a voltage between the electrodes and the metal surface to form a corrosion-resistant ceramic layer on the metal surface. The corrosion-resistant ceramic layer can be negatively charged. The method can include forming the reaction chamber using at least the metal surface. In some embodiments, the corrosion-resistant ceramic layer is disposed between at least a portion of the metal surface and the reaction chamber.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Reactors can be used for gasification, for example, gasification of coal. However, at temperature above water's critical point, corrosive solutes can precipitate, damaging a reactor's walls and shortening the useful life of the reactor. Some embodiments disclosed herein provide corrosion-resistant surfaces, which can be used, for example, in reactors. These corrosion-resistant surfaces can include, for example, corrosion-resistant ceramic layers.

In some embodiments, a corrosion-resistant layer is provided on at least one surface of a reaction chamber of the reactor. The corrosion-resistant layer can be negatively charged. In some embodiments, the corrosion-resistant layer has a graded negative potential, so that the electrical potential of the layer is weakest at the outer-most surface of the corrosion-resistant layer, and strongest at the surface that faces the reaction chamber. Without being bound by any particular theory, the negative potential of the corrosion-resistant layer can repel corrosive solutes, especially those that are negatively charged or include negative charges.

In some embodiments, the reactor can include a reaction chamber and a metal surface at least partially enclosing the reaction chamber. The reactor can include a corrosion-resistant layer (which can include ceramic) positioned between the metal surface (or a portion thereof) and the reaction chamber. In some embodiments, the corrosion-resistant layer is negatively charged. In some embodiments, the negatively charged layer can be a graded layer.

Figure 1:
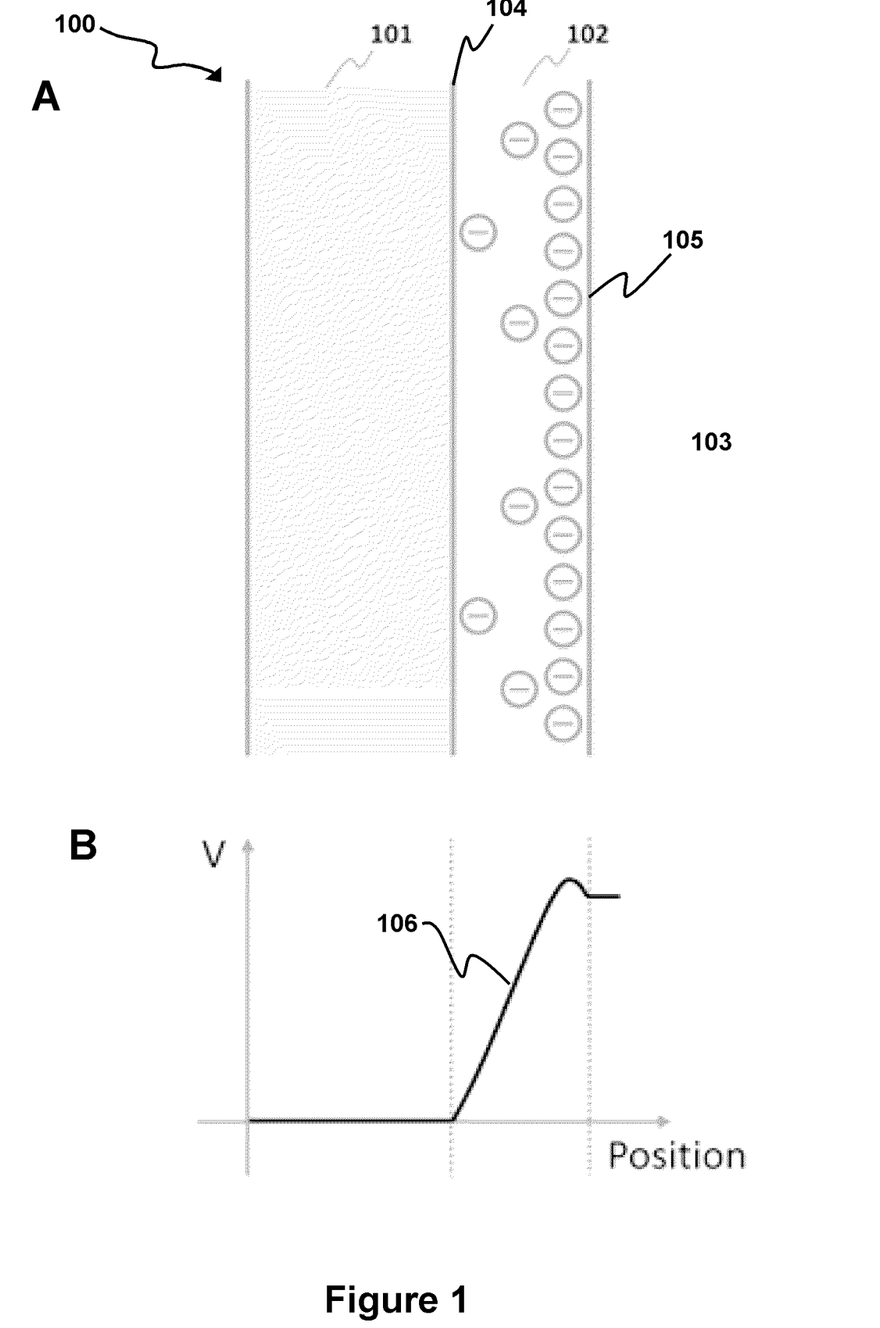
FIG. 1A is a schematic diagram of a cross section of a reactor wall according to some embodiments.
FIG. 1B is a schematic diagram of the potential at various positions of the layers of FIG. 1A, according to some embodiments.

FIG. 1A is a schematic diagram of a cross section of a reactor wall 100 according to some embodiments. The reactor wall 100 can be formed from a metal layer 101 and corrosion-resistant layer 102. The metal layer 101 can at least partially enclose a reaction chamber 103. The metal layer 101 can include at least one metal surface 104. The corrosion-resistant layer 102 can be positioned between the metal layer 101 and the reaction chamber 103. FIG. 1B is a schematic diagram of an electrical potential at various positions in FIG. 1A. As shown in FIG. 1B, in some embodiments, the potential 106 of the corrosion-resistant layer 102 can be graded from the surface of the corrosion-resistant layer nearest to the metal surface 104 to the surface 105 of the corrosion-resistant layer 102 facing the reaction chamber 103.

In some embodiments, the reactor is configured for supercritical gasification of organic materials. In some embodiments, the organic material includes coal. In some embodiments, the reactor is configured to withstand a temperature greater than or equal to about a supercritical temperature of water, and the reactor is configured to withstand a pressure greater than or equal to about a supercritical pressure of water (for example, 374° C. and 22.1 MPa/218 atm). In some embodiments, the reactor is configured to withstand temperature and/or pressure so that the reactor is not substantially damaged, deformed, structurally compromised, breached, and/or degraded at a temperature greater than or equal to about a supercritical temperature of water, nor at a pressure greater than or equal to about a supercritical pressure of water.

In some embodiments, the critical temperature of water is 374° C., and at 22.1 MPa. In some embodiments, the reactor can withstand a temperature at least about 1% greater than the supercritical temperature of water, for example, at least about 1%, 2%, 3%, 4%, 5%, 6%, 7%, 8%, 9%, 10%, 15%, 20%, 25%, 30%, 35%, 40%, 45%, 50%, 60%, 70%, 80%, 90%, 100%, 150%, 200%, 300%, 400%, or 500% greater than the supercritical temperature of water, including ranges between any two of the listed values. In some embodiments, the reactor can withstand a temperature at least about 1° C. greater than the supercritical temperature of water, for example at least about 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 25° C., 30° C., 35° C., 40° C., 45° C., 50° C., 55° C., 60° C., 65° C., 70° C., 75° C., 80° C., 86° C., 90° C., 95° C., 100° C., 110° C., 120° C., 130° C., 140° C., 150° C., 160° C., 170° C., 180° C., 190° C., 200° C., 250° C., 300° C., 350° C., 400° C., 450° C., 500° C., 550° C., 600° C., 650° C., 700° C., 750° C., 800° C., 850° C., 900° C., 950° C., 1000° C., 1500° C., 2000° C., 2500° C., 2626° C., or 3000° C. greater than the supercritical temperature of water, including ranges between any two of the listed values.

In some embodiments, the corrosion-resistant layer includes an aluminum silicate material. In some embodiments, the corrosion-resistant layer includes at least one of zeolite or montmorillonite. In some embodiments, the corrosion-resistant layer includes at least one zeolite and at least one montmorillonite.

In some embodiments, the corrosion-resistant layer has a thickness of about 1 µm to about 50,000 µm or more. In some embodiments, the corrosion-resistant layer has a thickness of at least about 0.1 µm, for example, a thickness of about 0.1 µm, 10 µm, 100 µm, 200 µm, 300 µm, 400 µm, 500 µm, 600 µm, 700 µm, 800 µm, 900 µm, 1000 µm, 1500 µm, 2000 µm, 3000 µm, 4000 µm, 5000 µm, 6000 µm, 7000 µm, 8000 µm, 9000 µm, 10,000 µm, 11,000 µm, 12,000 µm, 13,000 µm, 14,000 µm, 15,000 µm, 20,000 µm, 30,000 µm, 40,000 µm, or 50,000 µm including ranges between any two of the listed values or above any one of the listed values. In some embodiments, the corrosion-resistant layer can be ceramic. In some embodiments, the corrosion-resistant layer can be more than 10 nm in thickness. In some embodiments, the corrosion-resistant layer can be more than 100 nm in thickness.

In some embodiments, the charge of the corrosion-resistant layer is graded. In some embodiments, as one moves deeper into the corrosion-resistant layer from the metal surface toward the reaction chamber, the amount of charge can change. In some embodiments, the corrosion-resistant layer 102 is graded so that the negative charge of the corrosion-resistant layer 102 at a surface 105 facing the reaction chamber 103 is greater (that is, a stronger negative charge) than the amount of negative charge present nearer the metal surface 104 (as represented by the number of charges present in FIG. 1A). In some embodiments, the charge at the surface 105 facing the reaction chamber 103 is at least about 5% greater than the charge at the surface nearest the metal surface 104, for example, at least about 5%, 10%, 15%, 20%, 25%, 30%, 35%, 40%, 45%, 50%, 60%, 70%, 80%, 90%, 100%, 150%, 200%, 250%, 300%, 350%, 400%, 450%, 500%, 1,000%, 10,000%, 100,000%, or greater, including any range between any two of the preceding values and any range above any one of the preceding values. In some embodiments, the corrosion-resistant layer 102 has a graded negative potential that increases along an axis of the layer from a surface of the corrosion-resistant layer 102 nearest the metal surface 104 to a surface 105 of the corrosion-resistant layer 102 facing the reaction chamber 103. In some embodiments, the potential increases approximately linearly from the surface of the corrosion-resistant layer 102 nearest the metal surface 104 to the surface 105 facing the reaction chamber 103. In some embodiments, the potential increases non-linearly from the surface of the corrosion-resistant layer 102 nearest the metal surface 104 to the surface 105 facing the reaction chamber 103. In some embodiments, the potential increases as shown in FIG. 1B from the surface of the corrosion-resistant layer 102 nearest the metal surface 104 to the surface 105 facing the reaction chamber 103.

In some embodiments, at least a portion of the aluminum content and/or potential of the corrosion-resistant layer is graded. The corrosion-resistant layer can be ceramic. In some embodiments, the aluminum content and/or potential is graded continuously in at least a portion of the layer. In some embodiments, the aluminum content and/or potential is graded according to a step pattern in at least a portion of the layer. Thus, in some embodiments, the corrosion-resistant layer can include several sub-layers (discussed in more detail below in regard to FIG. 2), with each sub-layer having a different amount of negative charge present in it. Thus, while the corrosion-resistant layer can be graded as a whole, in some embodiments, the individual sub-layers of the corrosion-resistant layer do not need to be graded. In some embodiments, the corrosion-resistant layer is graded so that it includes two or more sub-layers with different concentrations of aluminum and/or silicon. In some embodiments, the concentration of aluminum increases from the sub-layer nearest the metal surface 104 to the sub-layer nearest the reaction chamber 103. Accordingly, in some embodiments, the strength of the negative charge increases from the sub-layer nearest the metal surface 104 to the sub-layer nearest the reaction chamber 103.

In some embodiments, the corrosion-resistant layer includes at least 2 sub-layers, for example, 2, 3, 4, 5, 6, 7, 8, 9, 10, 11, 12, 13, 14, 15, 16, 17, 18, 19, or 20 sub-layers, including ranges between any two of the listed values and any range above any one of the preceding values. In some embodiments, each sub-layer is substantially the same thickness. In some embodiments, for example, if a non-linear gradation in potential is desired, one or more of the sub-layers can be of different thicknesses.

Figure 2:
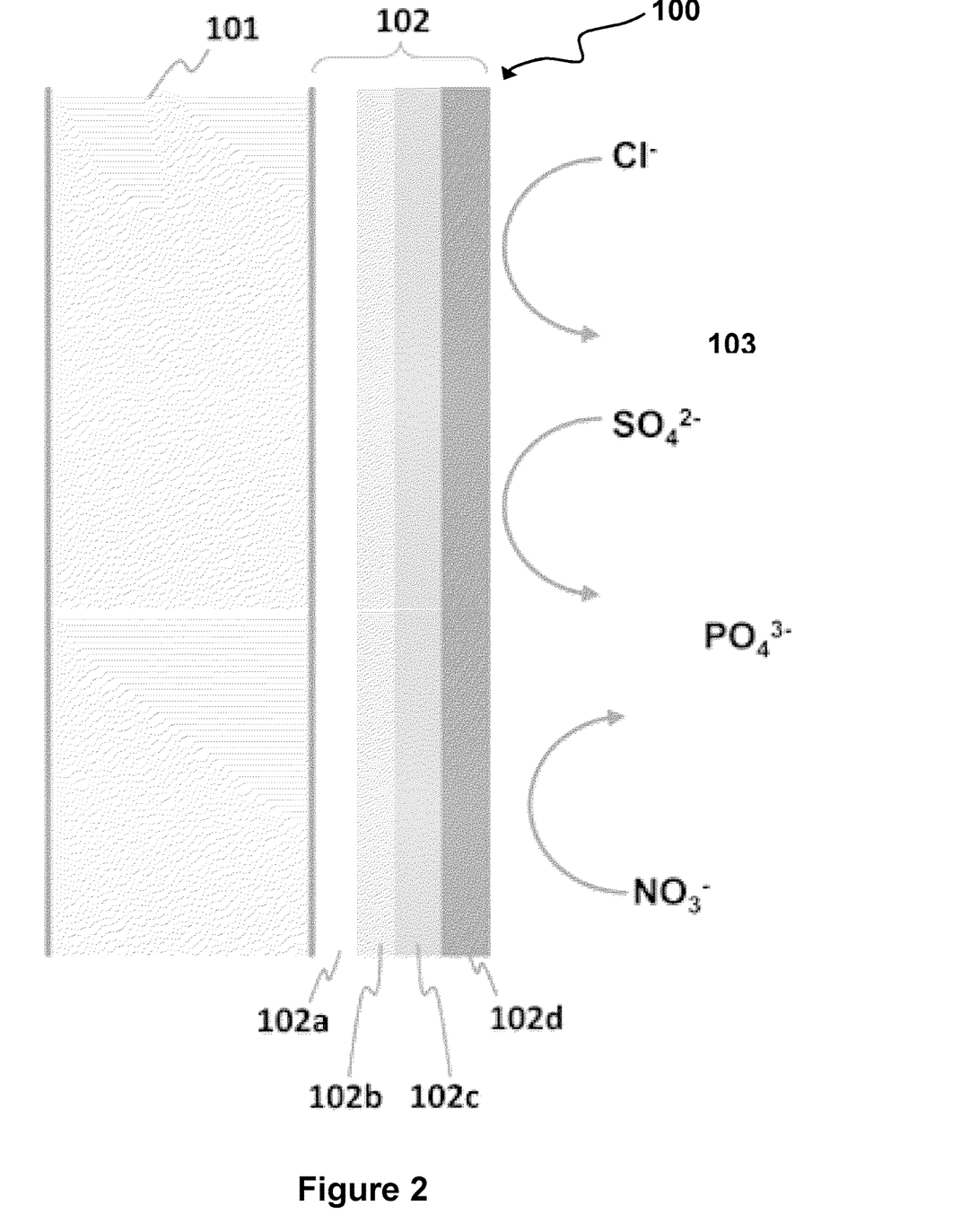
FIG. 2 is a schematic diagram of a cross section of a reactor wall with negative potential layers according to some embodiments.

FIG. 2 is a schematic diagram illustrating a cross section of a reactor wall 100 according to some embodiments. The wall of the reactor chamber itself can be made of metal layer 101. As noted above, in some embodiments, the corrosion-resistant layer 102 includes two or more sub-layers, for example, sub-layers 102a, 102b, 102c, and 102d. The concentration of charge (for example, as achieved via differing amounts of aluminum) in the sub-layers increases from the sub-layer nearest the metal surface 104 to the sub-layer nearest the reaction chamber 103, so that, with respect to aluminum concentration (and/or strength of negative charge), 102a<102b<102c<102d. In some embodiments, two or more consecutive sub-layers contact each other directly. In some embodiments, one or more intervening layers can be present between the sub-layers. In some embodiments, one or more (including all) of the sub-layers can be made of ceramic.

Figure 3:
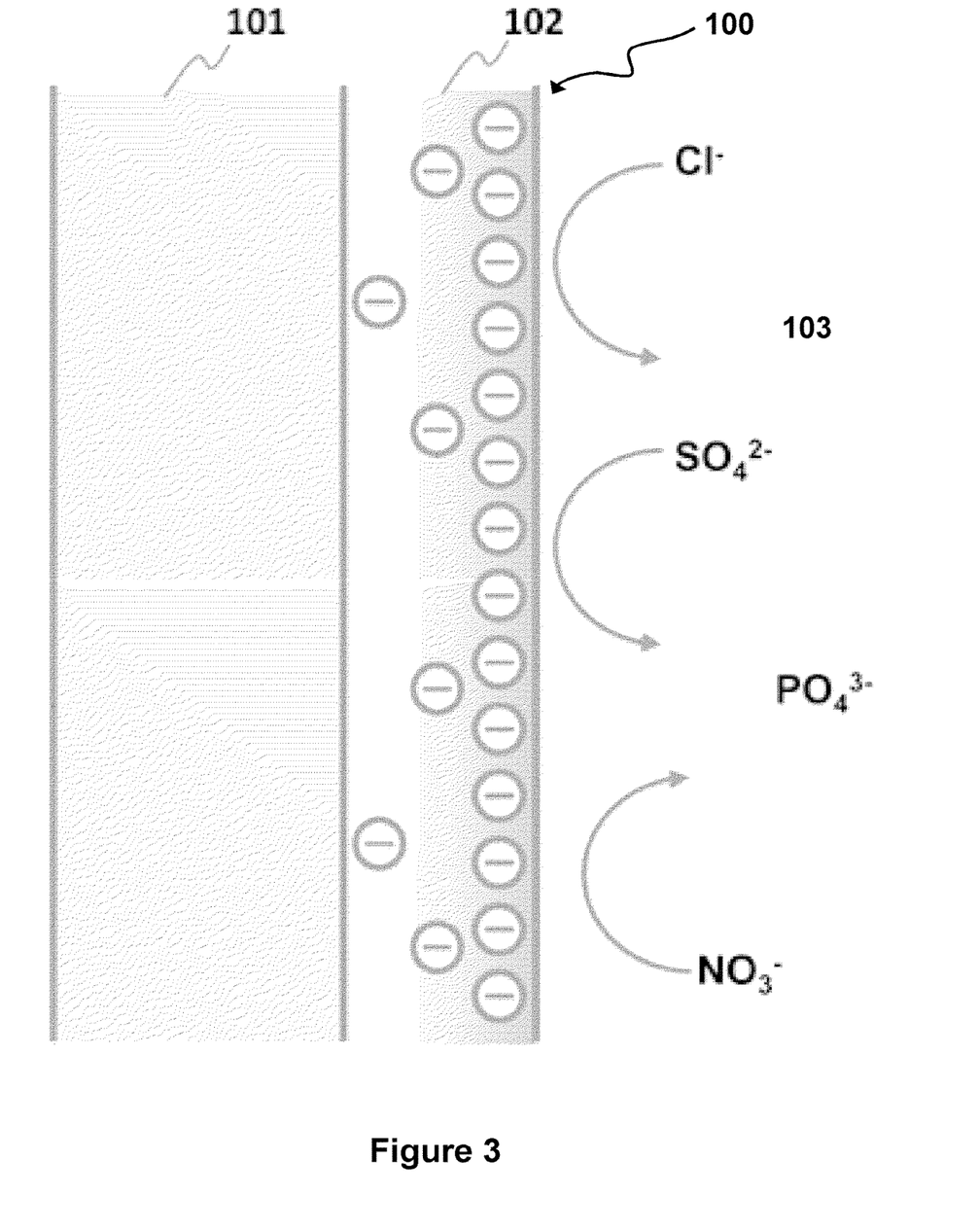
FIG. 3 is a schematic diagram of a negative potential layer repelling corrosive ions according to some embodiments.

In some embodiments, the corrosion-resistant layer repels corrosive ions, for example, $Cl^-$, $SO_4^{2-}$, $PO_4^{3-}$, and/or $NO_3^-$. In some embodiments, the corrosion-resistant layer repels any negatively charged ions and/or corrosive ions and/or molecules that include negative charges. FIG. 3 is a schematic diagram illustrating a cross section of a reactor wall 100 according to some embodiments. A corrosion-resistant layer 102 can be positioned between a metal layer 101 and the reaction chamber 103. The corrosion-resistant layer 102 can repel corrosive anions present in the reaction chamber 103. In some embodiments, the corrosion-resistant layer 102 has a negative potential that is strongest at a surface of the corrosion-resistant layer 102 that faces the reaction chamber 103. Accordingly, in some embodiments, the corrosion-resistant layer has a negative potential that is strongest at a surface at which solutes and the reactor wall interact. Without being bound to any particular theory, negative potential of the layer can repel corrosive anions. In some embodiments, the layer can include ceramic.

In some embodiments, the corrosion-resistant layer is nonporous. In some embodiments, the corrosion-resistant layer is porous. In some embodiments, a portion of the corrosion-resistant layer is non-porous and a portion is porous.

In some embodiments, the metal layer includes at least one of stainless steel, a super alloy of Ni, or a super alloy or Cr. In some embodiments, the metal layer includes one of Al, Cu, Fe, Ni, Ti, Ag, Au, Pt, or W, an alloy of at least one these elements, or two or more of the listed elements and/or alloys thereof. In some embodiments, the metal layer 101 is made of stainless steel and/or an outer surface of the metal layer is stainless steel. In some embodiments, the metal layer is stainless steel, and the stainless steel is not passivated. In some embodiments, the metal layer is stainless steel and the stainless steel is not passivated by immersion in $HNO_3$ and HF. In some embodiments, the metal layer provides a reactor frame and the corrosion-resistant layer is placed directly against the metal layer, and no additional protective and/or passivation layer is placed on the outer surface of the reactor wall 100 (facing the reaction chamber 103), beyond the charged corrosion-resistant layer provided herein.

In some embodiments, any one or more of the sub-layers described herein has thickness of at least about 0.1 µm, for example, a thickness of about 0.1 µm, 10 µm, 100 µm, 200 µm, 300 µm, 400 µm, 500 µm, 600 µm, 700 µm, 800 µm, 900 µm, 1000 µm, 2000 µm, 3000 µm, 4000 µm, 5000 µm, 6000 µm, 7000 µm, 8000 µm, 9000 µm, 10,000 µm, or greater, including ranges between any two of the listed values.

In some embodiments, the reactor includes water in the reaction chamber. In some embodiments, the water is in the form of steam. In some embodiments, the reactor includes an organic material, for example coal, in the reaction chamber. In some embodiments, the reactor includes a carbon based material, from which syngas can be extracted. In some embodiments, the reaction chamber can be part of any type of reactor for gasification. In some embodiments, the reaction chamber can be part of a Lurgi gasifier. In some embodiments, the reaction chamber can be configured for direct blowing. In some embodiments, the reaction chamber can be configured for reversed blowing.

In some embodiments, the reaction chamber is configured to hold a volume of at least 1 liter of reactants (for example, water and/or organic material), for example, at least about 1 liter, 2 liters, 3 liters, 4 liters, 5 liters, 6 liters, 7 liters, 8 liters, 9 liters, 10 liters, 15 liters, 20 liters, 30 liters, 40 liters, 50 liters, 60 liters, 70 liters, 80 liters, 90 liters, 100 liters, 200 liters, 300 liters, 400 liters, 500 liters, 1000 liters, 2000 liters, 3000 liters, 4000 liters, 5000 liters, 6000 liters, 7000 liters, 8000 liters, 9000 liters, 10,000 liters or more of reactants, including any range between any two of the preceding values and any range above any one of the preceding values.

In some embodiments, the reactor includes at least one heating element. The heating element can be thermally coupled to the reaction chamber. The heating element can be configured to heat water above a supercritical temperature of water as described herein. In some embodiments, the heating element contacts the metal layer. In some embodiments, at least a portion of the heating element is positioned between at least a portion of the metal layer and a least a portion of the corrosion-resistant layer. In some embodiments, the heating element is positioned in the interior of the reaction chamber (for example, proximal to the reaction chamber metal layer as compared to the corrosion-resistant layer). In some embodiments, the heating element can be located within the reaction chamber 103.

In some embodiments, the reaction chamber includes at least one inlet port. In some embodiments, the inlet port is fluidly coupled to the reaction chamber so as to provide water, an organic material, or water and an organic material to the reaction chamber. In some embodiments, the reaction chamber includes two or more inlet ports.

In some embodiments, the reaction chamber includes at least one outlet port. In some embodiments, the outlet port is fluidly coupled to the reaction chamber so as to receive a gas from the reaction chamber. In some embodiments, the reaction chamber includes two or more outlet ports. In some embodiments, at least one inlet port is also an outlet port. In some embodiments, at least one inlet port is not an outlet port. In some embodiments, an inlet port and outlet port are positioned at opposite ends of the reaction chamber. In some embodiments, at least one inlet port is positioned next to at least one outlet port. In some embodiments, at least one inlet port and/or outlet port can be reversibly sealed to gasses. In some embodiments, at least one inlet port and/or outlet is continuously open. In some embodiments, the at least one inlet port is in communication with a source and/or supply of an organic material (such as reserve containing coal). In some embodiments, the at least one outlet is in fluid communication with a reserve containing syngas. In some embodiments, the syngas includes carbon monoxide, hydrogen, carbon dioxide, and water vapor.

In some embodiments, a method of gasifying an organic material is provided. In some embodiments, the method includes providing a reactor. The reactor can include a reaction chamber, a metal surface at least partially enclosing the reaction chamber; and any of the corrosion-resistant layers as described herein. The method can include disposing organic material in the reaction chamber. The method can include contacting water with the organic material in the reaction chamber. In some embodiments, the water is at least at a supercritical temperature and a supercritical pressure. The method can include recovering a gas product from the reaction chamber. In some embodiments, the gas product can be a syngas. In some embodiments, the method can result in the production of carbon monoxide, hydrogen, carbon dioxide, and water vapor.

Figure 4:
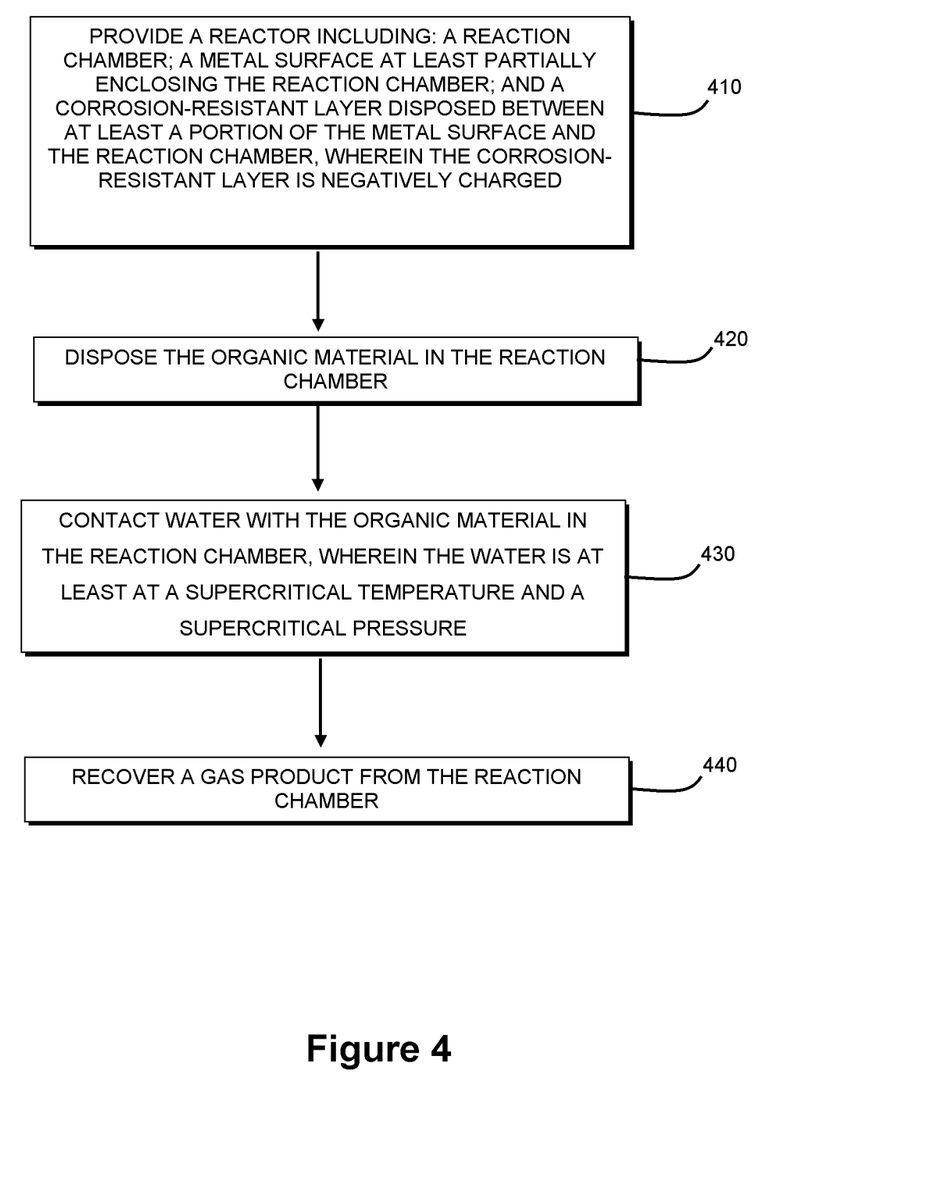
FIG. 4 is a flow diagram illustrating a method of gasifying an organic material according to some embodiments.

FIG. 4 is a flow diagram illustrating a method of gasifying a material. The method can include providing a reactor including a reaction chamber, a metal surface at least partially enclosing the reaction chamber, a corrosion-resistant ceramic layer disposed between at least a portion of the metal surface and the reaction chamber, in which the corrosion-resistant layer (which can be ceramic) is negatively charged 410. The method can include disposing the organic material in the reaction chamber 420. The method can include contacting water with the organic material in the reaction chamber 430. In some embodiments, the water is at least at a supercritical temperature and a supercritical pressure. The method can include recovering a gas product from the reaction chamber 440. Because of the corrosion-resistant layer, which can be a negatively charged and/or graded negatively charged, ceramic layer, the surface of the chamber will not be corroded as extensively by negatively charged corrosive ions.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the water is at a temperature of at least about 374° C., for example, at least about 374° C., 375° C., 380° C., 390° C., 400° C., 410° C., 420° C., 430° C., 440° C., 450° C., 460° C., 470° C., 480° C., 490° C., 500° C., 600° C., 700° C., 800° C., 900° C. or 1000° C., including ranges between any two of the listed values and any range above any one of the preceding values.

In some embodiments, the water is at a pressure of at least about 218 atm, for example, at least about 218 atm, 219 atm, 220 atm, 221 atm, 222 atm, 223 atm, 224 atm, 225 atm, 226 atm, 227 atm, 228 atm, 229 atm, 230 atm, 235 atm, 240 atm, 250 atm, 260 atm, 270 atm, 280 atm, 290 atm, 300 atm, 310 atm, 320 atm, 330 atm, 340 atm, 350 atm, 360 atm, 370 atm, 380 atm, 390 atm, 400 atm, 500 atm, 600 atm, 700 atm, 800 atm, 900 atm, or 1000 atm including ranges between any two of the listed values and any range above any one of the preceding values. In some embodiments, the water is at a temperature that exceeds the supercritical temperature of water. In some embodiments, the water is at a pressure that exceeds the supercritical pressure of water. In some embodiments, the water is at a temperature and pressure that exceed the supercritical temperature and pressure of water.

In some embodiments, the gas product includes a hydrocarbon gas. In some embodiments, the gas product includes a mixture of two or more hydrocarbon gasses. In some embodiments, the product includes a syngas. In some embodiments, the gas product includes one or more of: carbon monoxide, hydrogen, carbon dioxide, and water vapor. In some embodiments, the method can further include using the syngas for the production of synthetic natural gas and/or ammonia and/or methanol.

In some embodiments, the organic material includes coal or biomass. In some embodiments, the organic material is one that results in the formation of negatively charged corrosive ions when processed in the chamber.

In some embodiments, the corrosion-resistant layer is any of the corrosion-resistant layers as described herein, for example, the layer can be ceramic and/or negatively charged, and/or include a gradient of any of the negative charges present.

In some embodiments, a method of making a reaction chamber (or treating a surface thereof) is provided. The method can include forming a corrosion-resistant layer on a metal surface. In some embodiments, the corrosion-resistant layer has a negative charge and/or can be made of ceramic. In some embodiments, the method includes forming a reaction chamber, so that the corrosion-resistant layer is positioned between at least a portion of the metal surface and the reaction chamber. The corrosion-resistant layer can be a ceramic layer and/or include negative charges and/or have such negative charges arranged in a graded arrangement, as provided herein.

Figure 5:
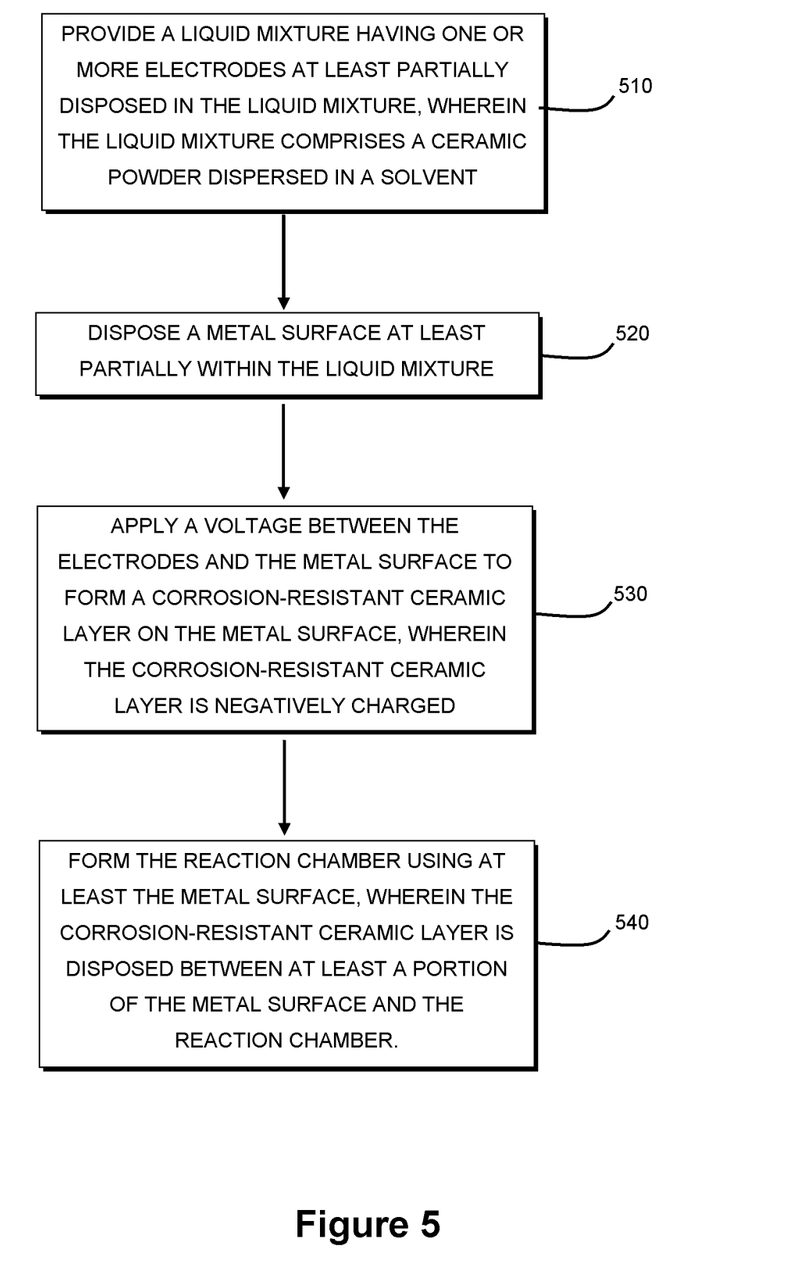
FIG. 5 is a flow diagram illustrating a method of making a reaction chamber according to some embodiments.

FIG. 5 is a flow diagram illustrating some embodiments of a method of making a reaction chamber. The method can include providing a liquid mixture having one or more electrodes at least partially disposed in the liquid mixture 510. In some embodiments, the liquid mixture includes a ceramic powder dispersed in a solvent. The method can include disposing a metal surface at least partially within the liquid mixture 520. The method can include applying a voltage between the electrodes and the metal surface to form a corrosion-resistant ceramic layer on the metal surface 530. In some embodiments, the corrosion-resistant ceramic layer is negatively charged. The method can include forming the reaction chamber using at least the metal surface 540. In some embodiments, the corrosion-resistant ceramic layer is disposed between at least a portion of the metal surface and the reaction chamber. In some embodiments, the layer formation process can include forming one or more sub-layers. In some embodiments, each sub-layer placed over the metal layer can have an increasing amount of negative charge associated with it. In some embodiments, this can be achieved by increasing an amount of aluminum present in each subsequent sub-layer placed over the metal layer. In some embodiments, a negatively charged species can be added to each layer to alter the charge as desired.

In some embodiments, the ceramic powder includes a zeolite or a montmorillonite. In some embodiments, the ceramic powder includes a zeolite and a montmorillonite. In some embodiments, the concentration of aluminum source in the liquid mixture (for example, zeolite or silica solution) is increased or decreased as the method is performed.

In some embodiments, the ceramic powder includes an aluminosilicate. In some embodiments, the aluminosilicate is an aluminum source. In some embodiments, the concentration of aluminum source is increased as the process is continued. In some embodiments, the concentration of aluminum source is decreased. In some embodiments, the concentration of aluminum source is increased or decreased gradually. In some embodiments, the concentration of aluminum source is increased linearly throughout the formation of the corrosion-resistant layer. In some embodiments, the concentration of aluminum source is increased non-linearly throughout the formation of the corrosion-resistant layer. In some embodiments, increased quantities of aluminum are added to the solvent. In some embodiments, the solvent is removed, and replaced with a solvent with a higher (or lower) concentration of aluminum source. In some embodiments, the substrate is removed from a bath having an aluminum source at first concentration in solvent, and placed in a bath having an aluminum source at second concentration in solvent. In some embodiments, the quantity of aluminum source is adjusted during at least a portion of the method so as to produce a graded quantity of aluminum in at least a portion of the corrosion-resistant layer as described herein.

In some embodiments, the metal surface is the surface of a metal layer as described herein (for example, it can be a stainless steel wall or frame of the reaction chamber).

In some embodiments, the voltage applied between the electrodes and the metal surface is about 10 V to about 10,000 V. In some embodiments, the voltage is about 100 V to about 1000 V. In some embodiments, the voltage is about 100 V to 10,000 V. In some embodiments, the voltage is about 10 V to about 1,000 V. In some embodiments, the voltage is at least about 10V, for example, at least about 10V, 20V, 30V, 40V, 50V, 60V, 70V, 80V, 90V, 100V, 150V, 200V, 250V, 300V, 350V, 400V, 450V, 500V, 550V, 600V, 605V, 700V, 750V, 800V, 850V, 900V, 950V, 1000V, 1100V, 1200V, 1300V, 1400V, 1500V, 1600V, 1700V, 1800V, 1900V, 2000V, 3000V, 4000V, 5000V, 6000V, 7000V, 8000V, 9000V, or 10,000 V, including ranges between any two of the listed values. In some embodiments, the voltage is applied continuously. In some embodiments, the voltage is supplied by a power supply in data communication with a computer processor that is programmed to apply voltage of one or more levels over one or more intervals.

In some embodiments, the solvent includes at least one of acetone, fluoroether, or hydrofluoroether. In some embodiments, the solvent includes a mixture of at least two of the listed substances. In some embodiments, ceramic powder in a solvent of a first substance or combination of substances is provided during a first portion of the method, and ceramic powder in a solvent of a second first substance or combination of substances is provided during a second portion of the method.

In some embodiments, the corrosion-resistant layer is formed to a thickness of about 1 μm to about 10,000 μm as described herein.

Figure 6:
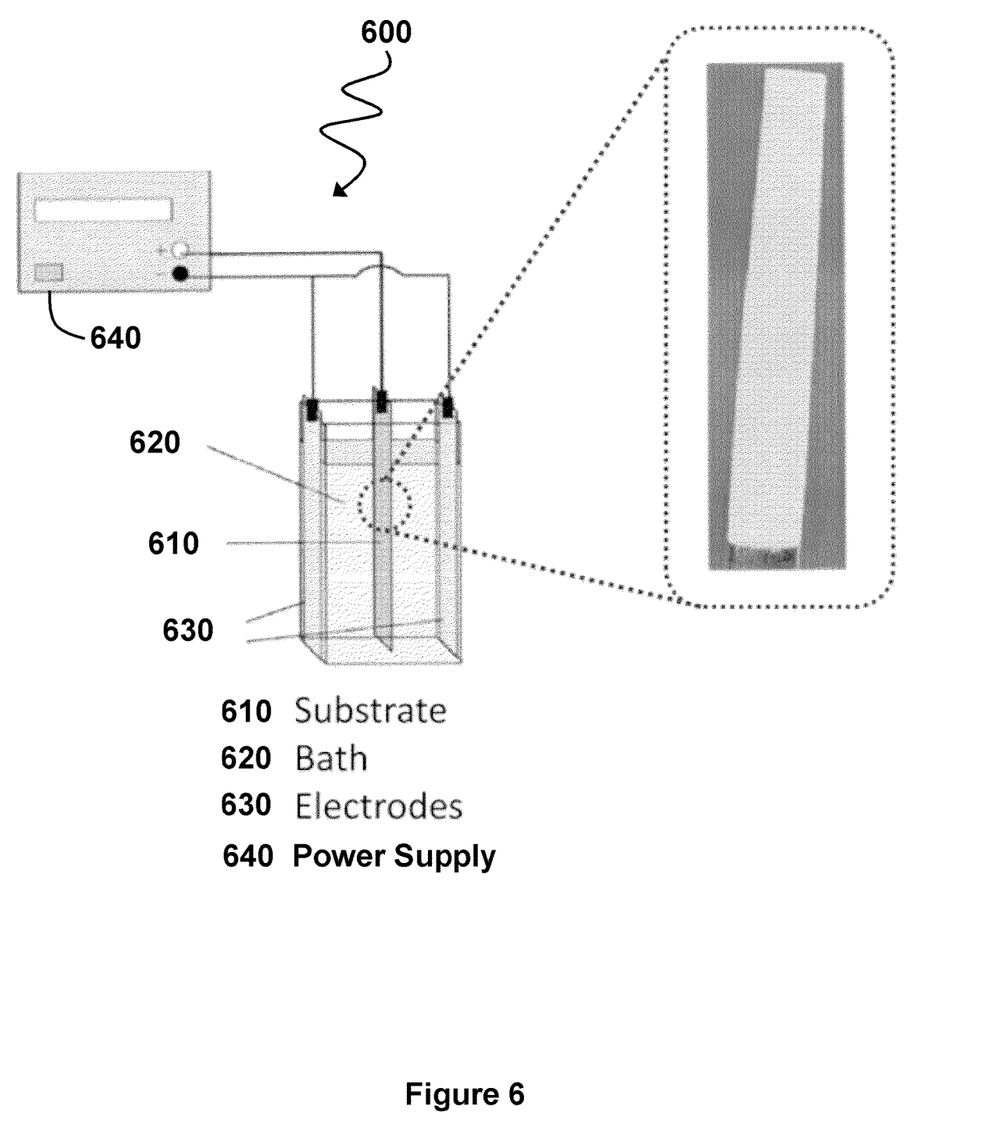
FIG. 6 is a schematic diagram of an apparatus configured to manufacture at least a portion of a reactor according to some embodiments.

FIG. 6 is a schematic diagram of an arrangement 600 for the manufacture at least a portion of a reactor according to some embodiments. The arrangement can include a substrate 610. The substrate 610 can include at least one anode electrode. The substrate can include a metal layer as described herein. The apparatus can include a bath 620. In some embodiments, the bath 620 includes a hydrofluoroether (or any other appropriate solvent). In some embodiments, the substrate 610 is submerged at least partially in the bath 620. In some embodiments, the substrate 610 is entirely submerged in the bath 620. In some embodiments, the substrate 610 is in electrical communication with at least one electrode 630 placed in the bath. In some embodiments, the substrate 610 acts as the cathode in the system, thereby attracting the negatively charged ions to its surface. In some embodiments, the electrode or electrodes 630 and the substrate 610 are in electrical communication with a power supply 640. In some embodiments, the power supply 640 is a direct current power supply.

In some embodiments, a negative potential layer can made be from ceramics, (for example, zeolite or montmorillonite) to perform as a corrosion-resistant layer. Zeolites are constructed of tetrahedral $AlO_4^{-5}$ and $SiO_4^{-4}$ molecules bound covalently by oxygen atoms. Due to trivalent silicon and quadrivalent aluminum bonded by divalent oxygen in a framework, silicon atoms can be neutral and aluminum atoms can be negatively charged, having negative potential as a whole. In some embodiments, zeolite has good thermal and chemical stability, and can withstand temperatures above a critical temperature of SCWG (for example, about 650° C.).

In some embodiments, a relatively thick layer of the corrosion-resistant layer (for example, about 1 mm) can be deposited on stainless steel, providing for high abrasion resistance with better cost effectiveness.

Example 1: Method of Making a First Corrosion-Resistant Ceramic Layer

A corrosion-resistant ceramic layer can be manufactured as follows. A substrate is provided. The substrate includes a metal layer that includes stainless steel on a surface of the metal layer. The stainless steel surface is placed in a liquid mixture that includes zeolite powder and aluminosilicate in an acetone solvent. A pair of anode electrodes is submerged in the liquid mixture, with the stainless steel acting as the cathode. A voltage of 100 V is applied between the anodes and cathode, so that a first corrosion-resistant ceramic layer is formed on the metal surface. The first corrosion-resistant layer is negatively-charged and has a thickness of about 200 μm.

Example 2: Method of Making a Second Corrosion-Resistant Ceramic Layer

The first corrosion-resistant ceramic layer is manufactured according to Example 1, and then further processed as follows. The first corrosion-resistant layer is then submerged in a second liquid mixture. A pair of electrodes is submerged in the second liquid mixture. The second liquid mixture includes a zeolite powder dispersed in acetone, and aluminosilicate is dissolved in the second liquid mixture at a concentration that is greater than the amount of aluminosilicate in liquid mixture of Example 1. A voltage of 100 V is applied between the electrodes and the metal layer, to form a second corrosion-resistant ceramic layer on the first corrosion-resistant ceramic layer. The second corrosion-resistant ceramic layer has a thickness of about 200 μm. The second corrosion-resistant ceramic layer has a greater negative charge than the first corrosion-resistant ceramic layer. The resulting combined layer will also contain a graded negative charge that increases towards the surface of the layer that is exposed to the reaction chamber.

Example 3: Method of Making a Third Corrosion-Resistant Ceramic Layer

A first and second corrosion-resistant ceramic layer is manufactured according to Example 2, and then further processed as follows. The corrosion-resistant layers are submerged in a third liquid mixture. The third liquid mixture includes a zeolite powder dispersed in acetone, and aluminosilicate is dissolved in the third liquid mixture at a concentration that is greater than the amount of aluminosilicate in second liquid mixture of Example 2. A voltage of 100 V is applied between the electrodes and the metal layer to form a third corrosion-resistant ceramic layer on the second corrosion-resistant ceramic layer. The third corrosion-resistant ceramic layer has a thickness of about 200 μm. The third corrosion-resistant ceramic layer has a greater negative charge than the second (and first) corrosion-resistant ceramic layers. The resulting combined layer will also contain a graded negative charge that increases towards the surface of the layer that is exposed to the reaction chamber.

Example 4: Method of Making a Second Corrosion-Resistant Ceramic Layer

A first corrosion-resistant ceramic layer is manufactured according to Example 1, and then further processed as follows. After the ceramic layer is formed, additional aluminosilicate powder is added to the liquid mixture to increase the concentration of aluminum in the liquid mixture to a concentration greater than in Example 1. The concentration of the aluminosilicate powder is effectively doubled in the solution. A voltage is applied between the electrodes and the metal layer to form a second corrosion-resistant ceramic layer on the corrosion-resistant ceramic layer. The second corrosion-resistant ceramic layer has a thickness of about 100 μm. The second corrosion-resistant ceramic layer has a greater negative charge than the first corrosion-resistant ceramic layer.

Example 5: Method of Making a Third Corrosion-Resistant Ceramic Layer

A first and second corrosion-resistant ceramic layer are manufactured according to Example 4, and then further processed as follows. After the second ceramic layer is formed, additional aluminosilicate powder is added to the liquid mixture to increase the amount of aluminum in the liquid mixture to an amount greater than in Example 2 (effectively tripling the amount of aluminosilcate powder to triple the initial level in Example 1). A voltage is applied between the electrodes and the metal layer to form a third corrosion-resistant ceramic layer on the corrosion-resistant ceramic layer. The third corrosion-resistant ceramic layer has a thickness of about 200 μm. The third corrosion-resistant ceramic layer has a greater negative charge than the second corrosion-resistant ceramic layer, and thus also has a greater negative charge than the first corrosion-resistant ceramic layer.

Example 6: Method of Making a Reactor

The ceramic layer or layers of any one of Examples 1-5 is positioned between the metal layer and the reaction chamber of a reactor that can be used for gasification. This is done for all of the surfaces of the reaction chamber that are exposed to negatively charged corrosive ions. In the alternative, the ceramic layers are only provided for those parts of the reaction chamber that are expensive and/or difficult to replace and are particularly susceptible to corrosion.

Example 7: Method of Gasification

A reactor that includes a 1 mm thick zeolite layer positioned between a metal surface and a reactor chamber is provided. The zeolite layer has a negative potential. Aluminum concentration is graded in the zeolite layer so that the aluminum concentration is lowest at the surface of the facing the metal surface, and highest at the surface of the layer facing the reaction chamber. Thus, the negative potential of the zeolite layer is graded, so that the negative potential is strongest at the surface facing the reaction chamber. Coal is placed in the reaction chamber, and the reaction chamber is sealed. In the reaction chamber, the coal is contacted with water at 390° C. and a pressure of 240 atm. The coal is gasified to form a hydrocarbon gas in the reaction chamber. The hydrocarbon gas is removed from the reaction chamber via an outlet in fluid communication with the reaction chamber. The presence of the zeolite layer reduces corrosion that would otherwise be caused by $Cl^{-1}$, $SO_4^{-2}$, and $PO_4^{-3}$ that result from the gasification of the coal.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A reactor comprising:
a reaction chamber;
a metal surface at least partially enclosing the reaction chamber; and
a corrosion-resistant ceramic layer disposed between at least a portion of the metal surface and the reaction chamber, the corrosion-resistant ceramic layer having a first surface facing the reaction chamber and a second surface facing the metal surface, wherein the corrosion-resistant ceramic layer is negatively charged and exhibits a negative charge at the first surface that is greater than a negative charge at the second surface.

2. The reactor of claim 1, wherein the reactor is configured for supercritical gasification of organic materials.

3. The reactor of claim 1, wherein the corrosion-resistant ceramic layer comprises an aluminosilicate material.

4. The reactor of claim 1, wherein the corrosion-resistant ceramic layer comprises at least one of a zeolite or a montmorillonite.

5. The reactor of claim 1, wherein the corrosion-resistant ceramic layer has a graded negative potential that increases along a thickness of the corrosion-resistant ceramic layer from the second surface to the first surface.

6. The reactor of claim 1, wherein the corrosion-resistant ceramic layer is nonporous.

7. The reactor of claim 1, wherein the corrosion-resistant ceramic layer is porous.

8. The reactor of claim 1, wherein the reactor is configured to withstand a temperature greater than or equal to about a supercritical temperature of water, and the reactor is configured to withstand a pressure greater than or equal to about a supercritical pressure of water.

9. The reactor of claim 1, wherein the metal surface comprises at least one of stainless steel, a superalloy of nickel, or a superalloy of chromium.

10. The reactor of claim 1, wherein the corrosion-resistant ceramic layer has a thickness of about 1 µm to about 10,000 µm.

11. The reactor of claim 1, further comprising at least one heating element thermally coupled to the reaction chamber and configured to heat water above a supercritical temperature of water.

12. The reactor of claim 1, further comprising at least one inlet port fluidly coupled to the reaction chamber, wherein the at least one inlet port is configured to provide at least one of water or an organic material to the reaction chamber.

13. The reactor of claim 1, further comprising at least one outlet port fluidly coupled to the reaction chamber, wherein the at least one outlet port is configured to receive a gas from the reaction chamber.

14. A method of gasifying an organic material, the method comprising:
providing a reactor comprising:
a reaction chamber;
a metal surface at least partially enclosing the reaction chamber; and
a corrosion-resistant ceramic layer disposed between at least a portion of the metal surface and the reaction chamber, the corrosion-resistant ceramic layer having a first surface facing the reaction chamber and a second surface facing the metal surface, wherein the corrosion-resistant ceramic layer is negatively charged and exhibits a negative charge at the first surface that is greater than a negative charge at the second surface;
disposing the organic material in the reaction chamber;
contacting water with the organic material in the reaction chamber, wherein the water is at least at a supercritical temperature and a supercritical pressure; and
recovering a gas product from the reaction chamber.

15. The method of claim 14, wherein the water is at the supercritical temperature of at least about 374° C.

16. The method of claim 14, wherein the water is at the supercritical pressure of at least about 218 atm.

17. The method of claim 14, wherein the gas product comprises a hydrocarbon gas.

18. The method of claim 14, wherein the organic material comprises coal.

19. The method of claim 14, wherein the corrosion-resistant ceramic layer comprises an aluminosilicate material.

20. The method of claim 14, wherein the corrosion-resistant ceramic layer has a graded negative potential that increases along a thickness of the corrosion-resistant ceramic layer from the second surface to the first surface.

21. A method of making a reaction chamber, the method comprising:
- providing a liquid mixture having one or more electrodes at least partially disposed in the liquid mixture, wherein the liquid mixture comprises a ceramic powder dispersed in a solvent;
- disposing a metal surface at least partially within the liquid mixture;
- applying a voltage between the one or more electrodes and the metal surface to form a first corrosion-resistant ceramic layer on the metal surface, wherein the first corrosion-resistant ceramic layer is negatively charged and at least partially forms a corrosion-resistant ceramic layer; and
- forming the reaction chamber using at least the metal surface, wherein the corrosion-resistant ceramic layer is disposed between at least a portion of the metal surface and the reaction chamber;
- wherein the corrosion-resistant ceramic layer exhibits a first surface facing the reaction chamber and a second surface facing the metal surface, and the corrosion-resistant ceramic layer exhibits a negative charge at the first surface that is greater than a negative charge at the second surface.

22. The method of claim 21, wherein the ceramic powder comprises a zeolite or a montmorillonite.

23. The method of claim 21, wherein the ceramic powder comprises an aluminosilicate.

24. The method of claim 21, wherein the ceramic powder comprises a zeolite and a montmorillonite.

25. The method of claim 21, wherein the metal surface comprises at least one of stainless steel, a superalloy of nickel, or a superalloy of chromium.

26. The method of claim 21, wherein the voltage applied is about 100 V to about 1000 V.

27. The method of claim 21, wherein the solvent is one or more of acetone, fluoroether, and hydrofluoroether.

28. The method of claim 21, further comprising:
- disposing the metal surface in a second liquid mixture having one or more second electrodes at least partially disposed in the second liquid mixture, wherein the second liquid mixture comprises a second ceramic powder dispersed in a second solvent, and wherein an amount of aluminium in the second liquid mixture is greater than an amount of aluminium in the liquid mixture; and
- applying a second voltage between the one or more second electrodes and the metal surface to form a second corrosion-resistant ceramic layer on the first corrosion-resistant ceramic layer, the first and second corrosion-resistant ceramic layers at least partially forming the corrosion-resistant ceramic layer, wherein the second corrosion-resistant ceramic layer has a greater negative charge than the first corrosion-resistant ceramic layer.

29. The method of claim 28, further comprising:
- disposing the metal surface in a third liquid mixture having one or more third electrodes at least partially disposed in the third liquid mixture, wherein the third liquid mixture comprises a third ceramic powder dispersed in a third solvent, and wherein an amount of aluminium in the third liquid mixture is greater than the amount of aluminium in the second liquid mixture; and
- applying a third voltage between the one or more third electrodes and the metal surface to form a third corrosion-resistant ceramic layer on the second corrosion-resistant ceramic layer, the first, second, and third corrosion-resistant ceramic layers at least partially forming the corrosion-resistant ceramic layer, wherein the third corrosion-resistant ceramic layer has a greater negative charge than the second corrosion-resistant ceramic layer.

30. The method of claim 21, further comprising:
- disposing a second ceramic powder in the liquid mixture to increase an amount of aluminium in the liquid mixture, wherein the second ceramic powder is disposed in the liquid mixture after forming the corrosion-resistant ceramic layer by applying the voltage; and
- applying a second voltage between the one or more electrodes and the metal surface to form a second corrosion-resistant ceramic layer on the first corrosion-resistant ceramic layer, the first and second corrosion-resistant ceramic layers at least partially forming the corrosion-resistant ceramic layer, wherein the second corrosion-resistant ceramic layer has a greater negative charge than the first corrosion-resistant ceramic layer.

31. The method of claim 30, further comprising:
- disposing a third ceramic powder in the liquid mixture to increase the amount of aluminium in the liquid mixture, wherein the third ceramic powder is disposed in the liquid mixture after forming the second corrosion-resistant ceramic layer by applying the second voltage; and
- applying a third voltage between the one or more electrodes and the metal surface to form a third corrosion-resistant ceramic layer on the second corrosion-resistant ceramic layer, the first, second, and third corrosion-resistant ceramic layers at least partially forming the corrosion-resistant ceramic layer, wherein the third corrosion-resistant ceramic layer has a greater negative charge than the second corrosion-resistant ceramic layer.

* * * * *

UNITED STATES PATENT AND TRADEMARK OFFICE
CERTIFICATE OF CORRECTION

PATENT NO. : 9,862,902 B2
APPLICATION NO. : 14/906530
DATED : January 9, 2018
INVENTOR(S) : Seike Page 1 of 1

It is certified that error appears in the above-identified patent and that said Letters Patent is hereby corrected as shown below:

On the Title Page

In Item (71), under "Applicant", in Column 1, Lines 1-3, delete "EMPIRE TECHNOLOGY DEVELOPMENT LLC, Wilmington (DE)" and insert -- EMPIRE TECHNOLOGY DEVELOPMENT LLC, Wilmington, DE (US) --, therefor.

In the Specification

In Column 3, Line 34, delete "example at" and insert -- example, at --, therefor.

In Column 3, Line 56, delete "0.1 μm, 10 μm," and insert -- 0.1 μm, 1 μm, 10 μm, --, therefor.

In Column 5, Line 61, delete "0.1 μm, 10 μm," and insert -- 0.1 μm, 1 μm, 10 μm, --, therefor.

In Column 9, Lines 61-62, delete "can made be" and insert -- can be made --, therefor.

Signed and Sealed this
First Day of May, 2018

Andrei Iancu
*Director of the United States Patent and Trademark Office*